US008736766B2

(12) United States Patent
Koyama et al.

(10) Patent No.: US 8,736,766 B2
(45) Date of Patent: May 27, 2014

(54) IMAGE PROCESSING DEVICE, IMAGE PROCESSING METHOD, IMAGE PROCESSING PROGRAM, AND RECORDING MEDIUM, EACH CAPABLE OF CORRECTING LUMINANCE OF IMAGE SO THAT THE LOCAL DETERIORATION OF GREY SCALES IS UNLIKELY TO OCCUR

(75) Inventors: Daisuke Koyama, Osaka (JP); Osamu Manba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/823,402

(22) PCT Filed: Oct. 14, 2011

(86) PCT No.: PCT/JP2011/073709
§ 371 (c)(1),
(2), (4) Date: Mar. 14, 2013

(87) PCT Pub. No.: WO2012/050203
PCT Pub. Date: Apr. 19, 2012

(65) Prior Publication Data
US 2013/0182185 A1 Jul. 18, 2013

(30) Foreign Application Priority Data
Oct. 15, 2010 (JP) .................. 2010-232997

(51) Int. Cl.
*H04N 5/14* (2006.01)
*H04N 5/57* (2006.01)
*G06K 9/00* (2006.01)
*H04N 5/20* (2006.01)
*G06T 5/40* (2006.01)
*H04N 5/202* (2006.01)
*H04N 1/60* (2006.01)
*G06T 5/00* (2006.01)

(52) U.S. Cl.
CPC ............... *H04N 5/202* (2013.01); *H04N 5/20* (2013.01); *G06T 5/40* (2013.01); *H04N 1/6027* (2013.01); *G06T 5/009* (2013.01)
USPC ............ 348/672; 348/687; 382/168; 382/169

(58) Field of Classification Search
USPC ................. 348/254, 255, 671–674, 678, 687; 345/589, 617, 690; 382/168, 169, 274; 358/446–448, 461
See application file for complete search history.

(56) References Cited

U.S. PATENT DOCUMENTS 5,289,282 A * 2/1994 Tsuji et al. .................... 348/624
5,546,134 A * 8/1996 Lee .............................. 348/673
(Continued)

FOREIGN PATENT DOCUMENTS

JP     3-255785 A    11/1991
JP    2002-204373 A    7/2002
(Continued)

*Primary Examiner* — Victor Kostak
(74) *Attorney, Agent, or Firm* — Birch, Stewart, Kolasch & Birch, LLP

(57) ABSTRACT

An image processing device (100) includes: a luminance distribution information preparation section (110) for preparing a luminance histogram in which each luminance range serves as a class, by counting the number of pixels belonging to each luminance range; a weight correction section (120) for generating, for each luminance range, a weighting value which is proportional to a corresponding class value; and an image processing section (140) for correcting a luminance value of each pixel so that a difference between a maximum luminance value and a minimum luminance value in the luminance range is determined by an increasing function with respect to both (i) a frequency of the luminance range and (ii) a weighting value of the luminance range.

11 Claims, 12 Drawing Sheets

(56) References Cited

U.S. PATENT DOCUMENTS

| | | | |
|---|---|---|---|
| 5,923,383 A * | 7/1999 | Kim | 348/672 |
| 6,148,103 A * | 11/2000 | Nenonen | 382/169 |
| 6,373,533 B1 * | 4/2002 | Kawabata et al. | 348/672 |
| 7,170,477 B2 * | 1/2007 | Okamoto et al. | 345/77 |
| 7,227,559 B2 | 6/2007 | Aoki et al. | 345/690 |
| 7,424,148 B2 * | 9/2008 | Goh | 382/169 |
| 7,839,455 B2 * | 11/2010 | Harada | 348/672 |
| 8,035,600 B2 * | 10/2011 | Hsu et al. | 345/98 |
| 8,125,569 B2 * | 2/2012 | Flores et al. | 348/672 |
| 8,478,042 B2 * | 7/2013 | Narasimha | 382/168 |
| 2002/0171663 A1 | 11/2002 | Kobayashi et al. | |
| 2005/0141777 A1 * | 6/2005 | Kuwata | 382/254 |
| 2005/0163372 A1 | 7/2005 | Kida et al. | |
| 2008/0024673 A1 * | 1/2008 | Cha | 348/678 |
| 2008/0037897 A1 * | 2/2008 | Chiang et al. | 382/273 |
| 2008/0123952 A1 * | 5/2008 | Parkkinen et al. | 382/168 |
| 2009/0009665 A1 * | 1/2009 | Tsutsumi et al. | 348/674 |
| 2009/0123067 A1 * | 5/2009 | Kuniba | 382/167 |
| 2011/0268358 A1 * | 11/2011 | Ikebe et al. | 382/172 |

FOREIGN PATENT DOCUMENTS

| | | |
|---|---|---|
| JP | 2002-247364 A | 8/2002 |
| JP | 2005-217574 A | 8/2005 |
| JP | 2009-65691 A | 3/2009 |

* cited by examiner

US 8,736,766 B2

IMAGE PROCESSING DEVICE, IMAGE PROCESSING METHOD, IMAGE PROCESSING PROGRAM, AND RECORDING MEDIUM, EACH CAPABLE OF CORRECTING LUMINANCE OF IMAGE SO THAT THE LOCAL DETERIORATION OF GREY SCALES IS UNLIKELY TO OCCUR

TECHNICAL FIELD

The present invention relates to an image processing device for carrying out image processing with respect to an image signal, and an image processing method employed by such an image processing device. Further, the present invention relates to an image processing program for carrying out image processing with respect to an image signal, and a recording medium in which such an image processing program is recorded.

BACKGROUND ART

In recent years, there has been expectation of an increase in demand for purchase of a digital television because analog television broadcasting would be replaced with digital television broadcasting. In expectation of such demand, various manufacturers have developed and sold a variety of digital televisions.

Some of digital television products which have been recently on the market are of a high-end model, such as a product which is capable of displaying a 3D image, a product employing a large display panel, and a product employing a large number of tuners. Note, however, that one of the most important subjects in development of digital televisions is improvement in video quality, irrespective of whether the digital televisions are low-end products or high-end products.

There are various techniques for improving video quality. One of such techniques is luminance correction processing carried out by an image processing device described in Patent Literature 1. This luminance correction technique is specifically described below with reference to FIG. 12 and FIG. 13. FIG. 12 is a block diagram schematically illustrating a configuration of the image processing device described in Patent Literature 1. FIG. 13 is a view showing (i) a luminance histogram is prepared by the image processing device of Patent Literature 1 on the basis of an input image which is a luminance correction target, and (ii) a function graph showing a relationship between a luminance value of each pixel of the input image and a luminance value of each pixel of an output image which is outputted from the image processing device.

The image processing device of Patent Literature 1 includes (i) a luminance distribution information preparation section for preparing a luminance histogram on the basis of a luminance value of each pixel of the input image and (ii) an amplification rate determining section for determining, for each luminance range, an amplification rate so that a relatively-large amplification rate is assigned to a class (luminance range) having a large frequency (a large number of pixels). An image processing section of the image processing device carries out luminance correction with respect to an input image on the basis of the amplification rate determined for each luminance range. In other words, the image processing section carries out luminance correction with respect to an input image so that an output image has an increase in difference between a maximum luminance and a minimum luminance in a pixel region constituted by pixels each having a luminance belonging to a luminance range having a large frequency.

The image processing device described in Patent Literature 1 causes a display device to display the output image that has been subjected to the luminance correction processing so that an image displayed on the display device can have a marked difference between a maximum luminance and a minimum luminance in a relatively wide pixel region in a display screen, as compared to a case where an input image is displayed as an output image on the display device without being subjected to the luminance correction processing. For example, in a case where a luminance histogram shown in a lower part of FIG. 13 is obtained based on an input image, the luminance correction processing causes a difference between a maximum luminance and a minimum luminance in a wide pixel region to change from A to A' (>A), as shown in a graph in an upper part of FIG. 13. That is, the image processing device described in Patent Literature 1 allows a user to view images which are higher in contrast.

CITATION LIST

Patent Literature

Patent Literature 1
Japanese Patent Application Publication, Tokukaihei No. 3-255785 A (1991) (Publication Date: Nov. 14, 1991)

SUMMARY OF INVENTION

Technical Problem

The image processing device described in Patent Literature 1 allows acquisition of an output image which is high in contrast as a whole, but cannot always suppress occurrence of local deterioration of gray scales in an output image sufficiently. The following description deals with this problem more specifically.

That is, the use of the luminance correction processing disclosed in Patent Literature 1 might have an opposite effect, i.e., a reduction in difference between a maximum luminance and a minimum luminance in some region in a display screen. For example, in a case where an input image has luminance distribution having a luminance characteristic in which frequencies are distributed across all the luminance ranges (each of the luminance ranges has a frequency), luminance correction might cause an opposite effect (a reduction in difference between a maximum luminance and a minimum luminance) in a pixel region constituted by pixels belonging to a luminance range having a low frequency. More specifically, in a case where the luminance histogram shown in the lower part of FIG. 13 is obtained based on an input image, for example, the luminance correction processing causes a difference between a maximum luminance and a minimum luminance in pixel regions to change from B to B' (<B) as shown in the graph in the upper part of FIG. 13.

Further, in a case where a luminance range on a high-luminance side has a low frequency, there is an increase in risk that a viewer might perceive occurrence of deterioration of gray scales in a pixel region (a pixel region on the high-luminance side) constituted by pixels each having a luminance belonging to the luminance range on the high-luminance side, as compared to a case where a luminance range on a low-luminance side has a low frequency.

This can be explained on the basis of the Weber-Fechner Law, according to which a minimum amount $\Delta S$ of change in stimulus that is perceivable by a human is expressed by an equality of $\Delta S = kS$ (where: S is a magnitude of a stimulus which has not been changed; and k is a constant). The Weber- Fechner Law supports, for example, a fact that a human feels a smaller difference in weight in a case where the human carries a 10-kilogram object after carrying a 9-kilogram object (an amount of change is 1 kg), as compared with a case where the human carries a 2-kilogram object after carrying a 1-kilogram object (an amount of change is 1 kg).

This also applies to perception of brightness. That is, a human feels a smaller difference in brightness in a case where the human view a pixel having a luminance value of "250" after viewing a pixel having a luminance value of "245" (a difference in luminance value is 5), as compared with a case where the human views a pixel having a luminance value of "10" after viewing a pixel having a luminance value of "5" (a difference in luminance value is 5). Accordingly, a reduction in difference between a maximum luminance and a minimum luminance in a pixel region on a high-luminance side causes an increase in risk that a viewer might perceive deterioration of gray scales.

However, according to the luminance correction processing disclosed in Patent Literature 1, even in a case where there are a low-luminance range and a high-luminance range which are identical with each other in frequency, luminance correction is carried out so that a pixel region on the low-luminance side and a pixel region on the high-luminance side are identical with each other in difference between a maximum luminance and a minimum luminance. For example, in a case where a luminance conversion function in each luminance range (a function expressing a relationship between (i) a luminance value (input luminance) of each pixel of an input image and (ii) a luminance value (output luminance) of each pixel of an output image) is expressed by a linear function shown in an upper part of FIG. 14, a low-luminance range and a high-luminance range, which are identical with each other in frequency, are identical with each other in inclination of the luminance conversion function, as shown in a lower part of FIG. 14.

For this reason, although the image processing device described in Patent Literature 1 can provide a high contrast image as a whole, the image processing device cannot always suppress local deterioration of gray scales effectively.

The present invention is made in view of the problems. A main object of the present invention is to realize an image processing device which is capable of correcting a luminance of an image so that local deterioration of gray scales is unlikely to occur.

Solution to Problem

In order to attain the object, an image processing device of the present invention, for correcting a luminance value of each pixel included in an image, includes: counting means for counting, for each of a plurality of luminance ranges into which an entire luminance range, within which the luminance value falls, is divided, the number of pixels as a first correction value, each of the pixels being included in the image and having a luminance belonging to the each of the plurality of luminance range; and luminance correcting means for correcting the luminance value of each pixel included in the image, in a case where (i) a first luminance range is provided on a low-luminance side with respect to a second luminance range, among the plurality of luminance ranges, and (ii) a first correction value for the first luminance range and a first correction value for the second luminance range are approximately equal to each other, the luminance correcting means correcting the luminance value of each pixel so that an amplification rate in the correcting carried out for the second luminance range is greater than an amplification rate in the correcting carried out for the first luminance range, the amplification rate in the correcting carried out for the first luminance range being an amplification rate of a difference between a maximum luminance and a minimum luminance, among luminances of pixels, belonging to the first luminance range included in the image, the amplification rate in the correcting carried out for the second luminance range being an amplification rate of a difference between a maximum luminance and a minimum luminance, among luminances of pixels, belonging to the second luminance range.

According to the configuration, the image processing device of the present invention (i) counts, for each of the plurality of luminance ranges, the number of pixels as a first correction value, each of the pixels having a luminance belonging to the luminance range. In a case where a first correction value of a highest luminance range among the plurality of luminance ranges and a first correction value of a lowest luminance range among the plurality of luminance ranges are approximately equal to each other, the image processing device corrects the luminance value of each pixel included in the image so that a difference between a maximum luminance and a minimum luminance in the highest luminance range is greater than a difference between a maximum luminance and a minimum luminance in the lowest luminance range. With the arrangement, it is possible for the image processing device to suppress, after luminance correction is carried out, occurrence of deterioration of gray scales in a local pixel region constituted by pixels having a high luminance, which pixel region is likely to be perceived by a viewer as having deterioration of gray scales.

As described above, the image processing device of the present invention can correct a luminance of an image so that a local deterioration of gray scales in the image is unlikely to occur.

In order to attain the object, an image processing method for use in an image processing device for correcting a luminance value of each pixel included in an image, includes the steps of: counting, by counting means of the image processing device, for each of a plurality of luminance ranges into which an entire luminance range, within which the luminance value falls, is divided, the number of pixels as a first correction value, each of the pixels being included in the image and having a luminance belonging to the each of the plurality of luminance range; and correcting, by luminance correcting means of the image processing device, the luminance value of each pixel included in the image, in a case where (i) a first luminance range is provided on a low-luminance side with respect to a second luminance range, among the plurality of luminance ranges, and (ii) a first correction value for the first luminance range and a first correction value for the second luminance range are approximately equal to each other, said correcting being carried out so that an amplification rate in the correcting carried out for the second luminance range is greater than an amplification rate in the correcting carried out for the first luminance range, the amplification rate in the correcting carried out for the first luminance range being an amplification rate of a difference between a maximum luminance and a minimum luminance, among luminances of pixels, belonging to the first amplification rate in the correcting carried out for the second luminance range being an amplification rate of a difference between a maximum luminance and a minimum luminance, among luminances of pixels, belonging to the second luminance range.

According to the above configuration, the image processing method of the present invention has the same effects as those of the image processing device of the present invention.

Advantageous Effects of Invention

As described above, the image processing device of the present invention can correct a luminance of an image so that local deterioration of gray scales is unlikely to occur.

DESCRIPTION OF EMBODIMENTS

Embodiment 1

Figure 1:
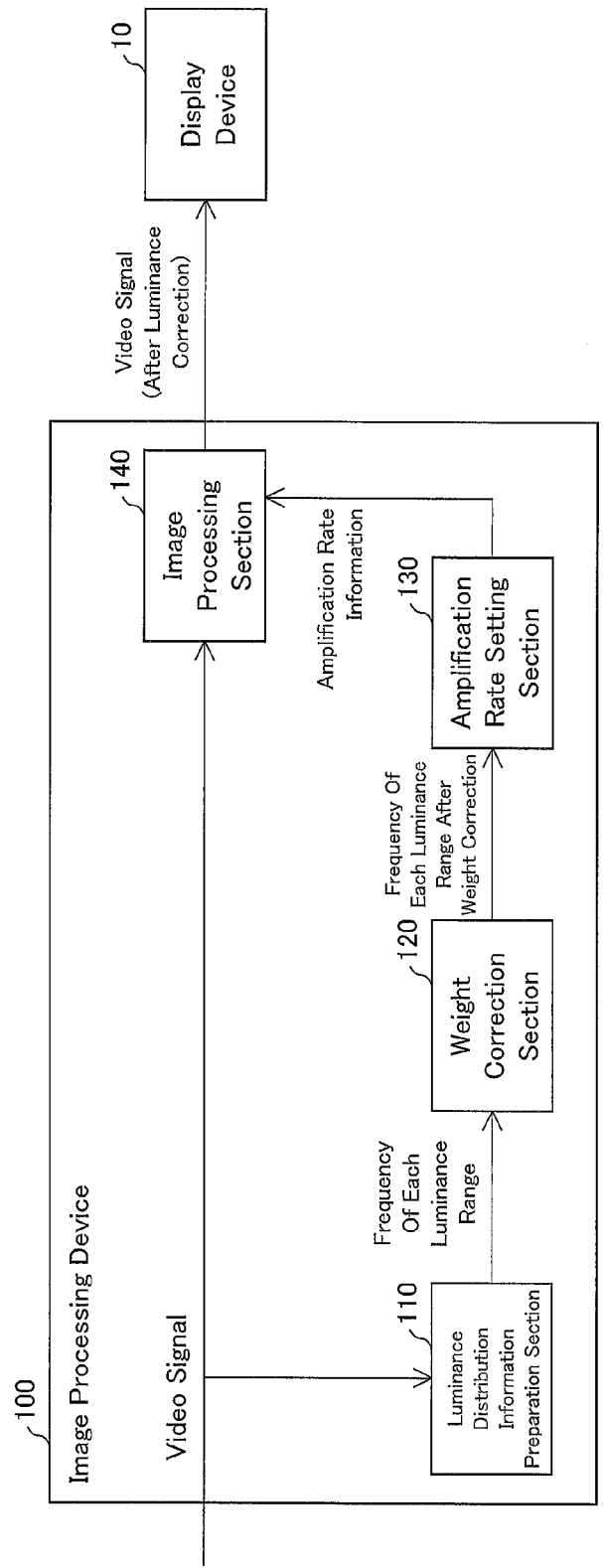
FIG. 1 is a block diagram illustrating a configuration of an image processing device in accordance with an embodiment of the present invention.

The following description will discuss, with reference to FIGS. 1 to 9, an image processing device in accordance with one embodiment of the present invention. First, a configuration of an image processing device according to the present embodiment is discussed with reference to FIG. 1. FIG. 1 is a block diagram illustrating a main configuration of the image processing device.

(Configuration of Image Processing Device 100)

An image processing device 100 includes a luminance distribution information preparation section 110, a weight correction section 120, an amplification rate setting section 130, and an image processing section 140 (see FIG. 1). Further, the image processing device 100 includes an operation section (not illustrated), via which an instruction on whether to carry out luminance correction processing are received from a user.

(Luminance Distribution Information Preparation Section 110)

Upon receipt of an input signal, the luminance distribution information preparation section 110 (i) reads a luminance value of each pixel of an image indicated by the image signal, and (ii) counts, for each of N luminance ranges into which an entire 0-255 luminance range is divided, the number of pixels each having a luminance value belonging to the luminance range. Then, the luminance distribution information preparation section 110 prepares a luminance histogram on the basis of the number of pixels (a first correction value) counted for each of the luminance ranges. In other words, the luminance distribution information preparation section 110 prepares a luminance histogram in which (i) a luminance range serves as a class and (ii) the number of pixels counted for the luminance range serves as a frequency of the class.

(Weight Correction Section 120)

The weight correction section 120 (i) generates, for each integer i of integers 1 through N (hereinafter, merely referred to as "each i", in some cases), a weighting value (a second correction value) which is in direct proportion to a magnitude of a class value of an ith luminance range (hereinafter, referred to as "luminance range i", in some cases) from a low-luminance side, (ii) corrects an inputted frequency of the luminance range i with the use of the weighting value thus generated, and (iii) outputs the frequency thus corrected. Specifically, the weight correction section 120 (i) generates N weighting values which are in direct proportion to magnitudes of class values, (ii) corrects a frequency of each luminance range by adding a corresponding weighting value to the frequency, and (iii) outputs the frequency thus corrected.

Further, the weight correction section 120 is configured to be capable of (i) generating N weighting factors which are in direct proportion to magnitudes of class values, (ii) correcting a frequency of each luminance range by multiplying the frequency by a corresponding weighting factor, and (iii) outputting the frequency thus corrected.

Note that the image processing device 100 can receive, via the operation section (not illustrated), from a user, an instruction on whether to carry out weighting correction with respect to frequencies. In a case where the image processing device 100 receives an instruction not to correct frequencies with the use of weighting values, the weight correction section 120 outputs the inputted frequency of each luminance range without carrying out any correction.

(Amplification Rate Setting Section 130)

The amplification rate setting section 130 generates amplification rate information which corresponds to a weight-corrected frequency of each luminance range. Specifically, the amplification rate setting section 130 determines, for each i, an amplification rate (which is not less than 1.0) in accordance with a magnitude of a weight-corrected frequency of the luminance range i, in a case where the weight-corrected frequency of the luminance range i is not less than one Nth of a total sum of weight-corrected frequencies of luminance ranges 1 through N. Further, the amplification rate setting section 130 determines, for each i, an amplification rate (which is less than 1.0) in accordance with a magnitude of the weight-corrected frequency of luminance range i, in a case where the weight-corrected frequency of luminance range i is less than one Nth of the total sum of the weight-corrected frequencies of luminance ranges 1 through N.

Then, the amplification rate setting section 130 generates amplification rate information including an amplification rate of each of the luminance ranges 1 through N (hereinafter, referred to as "each luminance range i", in some cases).

(Image Processing Section 140)

The image processing section 140 corrects a luminance of each pixel of an input image on the basis of the amplification rate information thus generated.

Specifically, the image processing section 140 corrects, for each i, a luminance of each pixel included in the input image so that a difference in luminance between a pixel having a maximum luminance value and a pixel having a minimum luminance value in the luminance range i increases or decreases in accordance with an amplification rate of the luminance range i, which amplification rate is included in the amplification rate information.

The image processing section 140 then outputs, to the outside, an output image obtained through the luminance correction.

(Operation of Image Processing Device 100)

Next, the following description deals with, with reference to FIGS. 2 through 5, how the image processing device 100 carries out luminance correction with respect to an input image. Here, the luminance correction is carried out in a case where the image processing device 100 has received an instruction to correct a frequency with the use of a weighting value.

Figure 2:
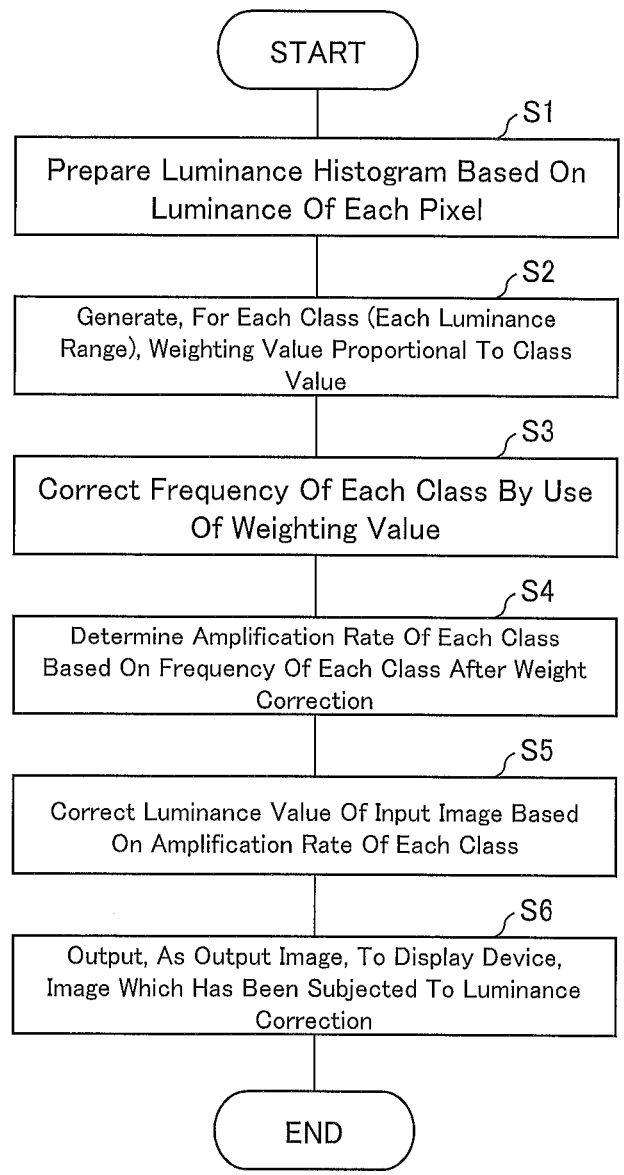
FIG. 2 is a flowchart showing an operation of luminance correction processing, carried out by the image processing device illustrated in FIG. 1 with respect to an input image.

FIG. 2 is a flowchart showing an operation of the image processing device from a time that the image processing device 100 receives an image signal to a time that the image processing device 100 causes a display device 200 to display an output image.

Figure 3:
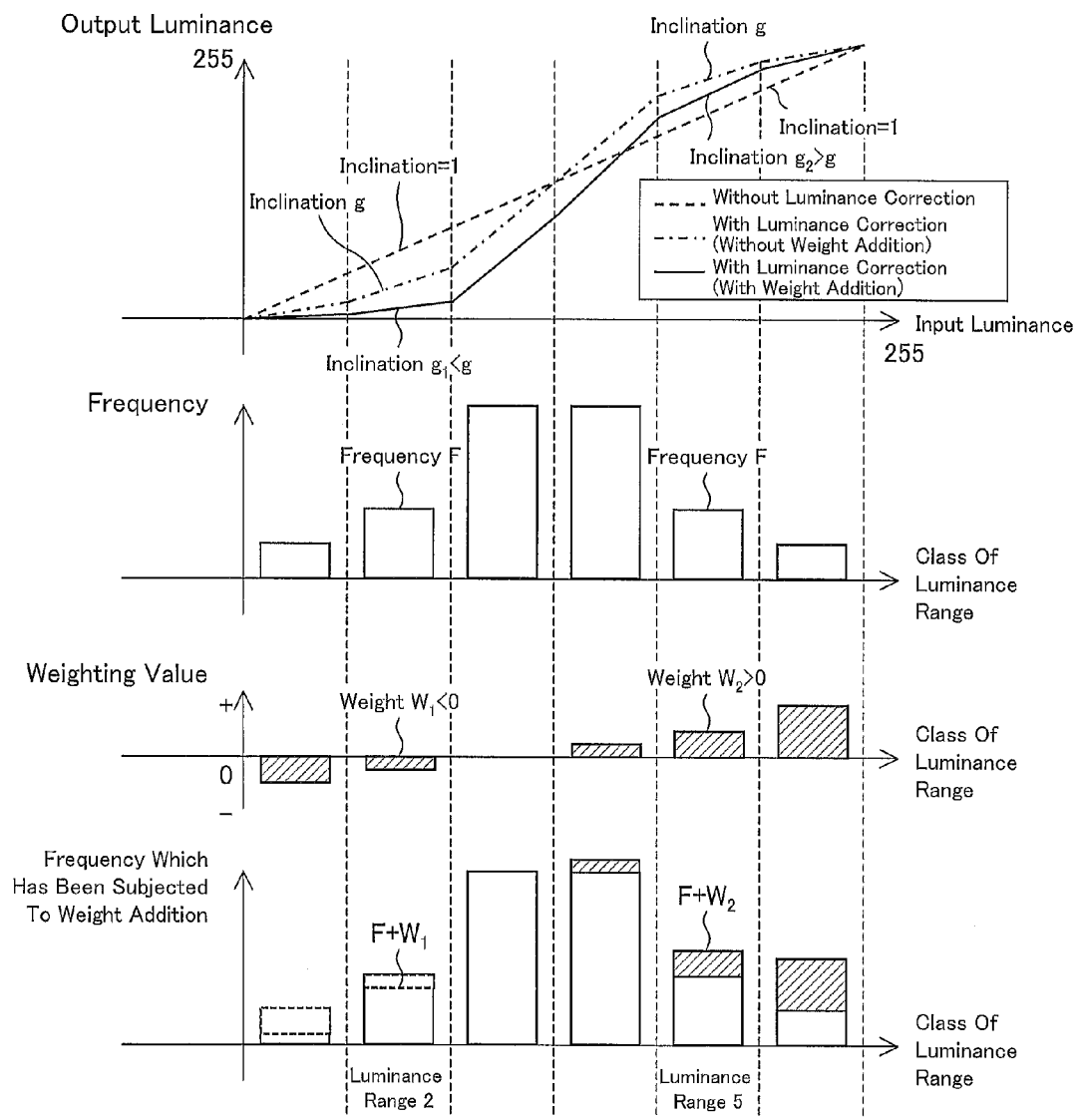
FIG. 3 is a view showing specific examples of the following (i) through (iv): (i) a luminance histogram prepared by the image processing device illustrated in FIG. 1 based on an input image which is a luminance correction target; (ii) a weighting value of each class of the luminance histogram; (iii) a weighted frequency of each class; and (iv) a function graph indicating a relationship between a luminance value of each pixel of the input image and a luminance value of each pixel of an output image that is outputted from the image processing device.

FIG. 3 is a view showing four coordinate planes. A graph in a second coordinate plane from the top in FIG. 3 is a luminance histogram which is prepared by the luminance distribution information preparation section 110 on the basis of an input image I. A third graph from the top in FIG. 3 shows a specific example of a weighting value of each class of the luminance histogram, which weighting value is generated by the weight correction section 120. A graph in a lowest coordinate plane in FIG. 3 shows a frequency of each class, which frequency has been subjected to a weight adding process carried out by the weight correction section 120. A graph drawn in a full line in a highest coordinate plane in FIG. 3 is a function graph indicating a specific example of a relationship between a luminance value of each pixel of the input image I and a luminance value of each pixel of an output image that is outputted from the image processing section 140.

Figure 4:
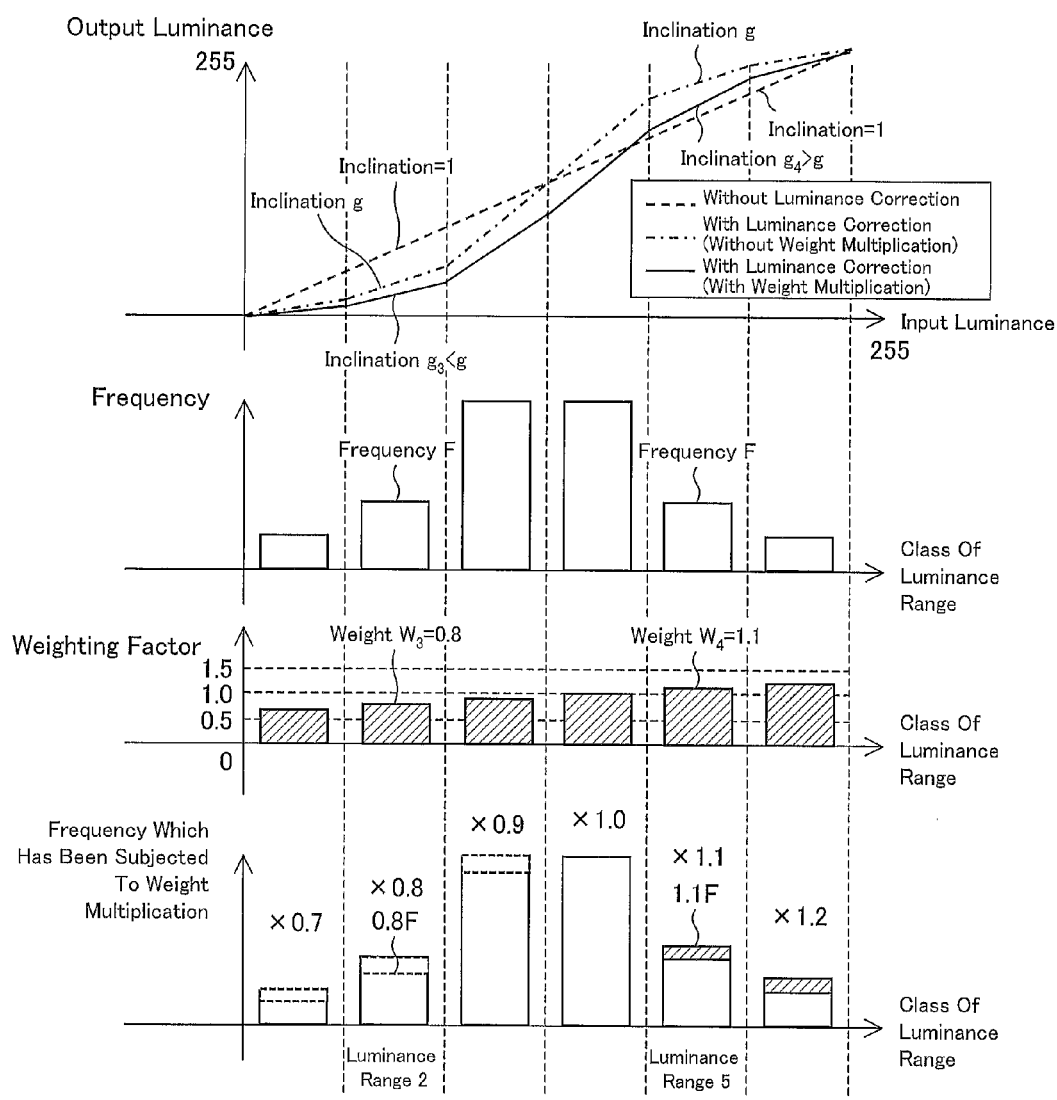
FIG. 4 is a view showing specific examples of the following (i) through (iv): (i) a luminance histogram prepared by the image processing device illustrated in FIG. 1 based on an input image which is a luminance correction target; (ii) a weighting value of each class of the luminance histogram; (iii) a weight-multiplied frequency of each class; and (iv) a function graph indicating a relationship between a luminance value of each pixel of the input image and a luminance value of each pixel of an output image.
Figure 5:
FIG. 5 is a view showing an example of an input image which is supplied to the image processing device in FIG. 1.

Similarly, FIG. 4 is a view showing four coordinate planes. A graph in a second coordinate plane from the top in FIG. 4 is a luminance histogram of the input image I which is prepared by the luminance distribution information preparation section 110 on the basis of the input image I. A graph in a third coordinate plane from the top in FIG. 4 shows a specific example of a weighting factor of each class of the luminance histogram, which weighting factor is generated by the weight correction section 120. A graph in a lowest coordinate plane in FIG. 4 shows a frequency of each class, which frequency has been subjected to weighting factor-multiplying process carried out by the weight correction section 120. A graph drawn in a full line in a highest coordinate plane in FIG. 4 is a function graph indicating a specific example of a relationship between a luminance value of each pixel of the input image I and a luminance value of each pixel of an output image that is outputted from the image processing section 140.

As shown in FIG. 2, the luminance distribution information preparation section 110 of the image processing device 100 prepares a luminance histogram on the basis of a luminance value of each pixel of an input image indicated by an image signal externally supplied to the image processing device 100 (S1). Then, the luminance distribution information preparation section 110 outputs, to the weight correction section 120, information indicating a frequency of each class (each luminance range) of the luminance histogram.

Next, the weight correction section 120 generates a weighting value that is in direct proportion to a magnitude of a class value, on the basis of the information indicating the frequency of each class (each luminance range), which information is received from the luminance distribution information preparation section 110 (S2). Then, the weight correction section 120 outputs, to the amplification rate setting section 130, a value obtained by adding the weighting value to an inputted frequency of each luminance range, as a weight-corrected frequency of each luminance range (S3).

In other words, the weight correction section 120 generates N (N is 6 in FIG. 3) weighting values, as shown in the graph in the third coordinate plane from the top in FIG. 3, and adds, for each i, the weighting value of the luminance range i to a frequency of the luminance range i. For example, the weight correction section 120 (i) adds $W_1$ (negative weight) to a frequency F of a luminance range 2 so that a weight-corrected frequency of the luminance range 2 is $F+W_1$ (<F), and (ii) adds $W_2$ (positive weight) to a frequency F of a luminance range 5 so that a weight-corrected frequency of the luminance range 5 is $F+W_2$ (>F) (as shown in the graphs in the second, third, and fourth coordinate planes from the top in FIG. 3).

Alternatively, the weight correction section 120 can carry out the following processes in the steps S2 and S3.

That is, the weight correction section 120 can, in S2, (i) generate a weighting value that is in direct proportion to a magnitude of a class value, on the basis of information indicating a frequency of each class (each luminance range) received from the luminance distribution information preparation section 110, and (ii) multiply an inputted frequency of each luminance range by a corresponding weighting factor. Then, the weight correction section 120 can output, as a weight-corrected frequency of each luminance range, a value obtained by multiplying the frequency of each luminance range by the corresponding weighting factor, to the amplification rate setting section 130.

In this case, the weight correction section 120 generates N (N is 6 in FIG. 4) weighting factors, as shown in the graph in the third coordinate plane from the top in FIG. 4, and multiplies, for each i, a frequency of a luminance range i by a weighting factor of the luminance range i. For example, the weight correction section 120 (i) multiplies a frequency F of a luminance range 2 by a weighting factor of 0.8 (less than 1) so that a weight-corrected frequency of the luminance range 2 is 0.8F (<F), and (ii) multiplies a frequency F of a luminance range 5 by a weighting factor of 1.1 (not less than 1) so that a weight-corrected frequency of the luminance range 5 is 1.1F (>F) (as shown in the graphs in the second, third, and fourth coordinate planes from the top in FIG. 4).

After the process of S3 is carried out, the amplification rate setting section 130 sets an amplification rate of each luminance range on the basis of the weight-corrected frequency of each luminance range, supplied from the weight correction section 120 (S4). That is, as described earlier, the amplification rate setting section 130 determines, for each i, an amplification rate of not less than 1.0 in accordance with a magnitude of a weight-corrected frequency of a luminance range i, in a case where the weight-corrected frequency of the luminance range i is not less than one Nth of a total sum of weight-corrected frequencies of the luminance ranges 1 through N. Further, the amplification rate setting section 130 sets, for each i, an amplification rate of less than 1.0 in accordance with a magnitude of a weight-corrected frequency of the luminance range i, in a case where the weight-corrected frequency of the luminance range i is less than one Nth of the total sum of the weight-corrected frequencies of the luminance ranges 1 through N.

For example, in the case of the graph in the lowest coordinate plane in FIG. 3, since a weight-corrected frequency $F+W_1$ of the luminance range 2 is less than one Nth of a total sum of the weight-corrected frequencies, a value $g_1$, which is smaller than 1.0 by a certain degree, is set as an amplification rate of the luminance range 2. Further, since a weight-corrected frequency $F+W_2$ of the luminance range 5 is substantially equal to one Nth of a total sum of the weight-corrected frequencies, a value $g_2$, which is approximately 1.0, is set as an amplification rate of the luminance range 5. Furthermore, for example, in the case of the graph in the lowest coordinate plane in FIG. 4, since a weight-corrected frequency $F \times W_3$ of the luminance range 2 is less than one Nth of a total sum of the weight-corrected frequencies, a value $g_3$, which is smaller than 1.0 by a certain degree, is set as an amplification rate of the luminance range 2. Further, since a weight-corrected frequency $F \times W_4$ of the luminance range 5 is substantially equal to one Nth of a total sum of the weight-corrected frequencies, a value $g_4$, which is approximately 1.0, is set as an amplification rate of the luminance range 5.

After the process of S4 is carried out, the amplification rate setting section 130 outputs, to the image processing section 140, amplification rate information including the amplification rate of each luminance range.

The image processing section 140 carries out, on the basis of the amplification rate information received from the amplification rate setting section 130, luminance correction with respect to an image signal externally supplied to the image processing device 100 (S5). Specifically, the image processing section 140 corrects, for each i, a luminance value of each pixel included in an input image so that a difference in luminance between a pixel having a maximum luminance value and a pixel having a minimum luminance value in a luminance range i is multiplied by an amplification rate of the luminance range i.

For example, in the case of each of the graphs in the highest coordinate plane in FIG. 3, the image processing section 140 corrects a luminance of each pixel in the luminance range 2 so that a difference in luminance between a pixel having a maximum luminance value and a pixel having a minimum luminance value in the luminance range 2 is multiplied by $g_1$. Further, the image processing section 140 corrects a luminance of each pixel in the luminance range 5 so that a difference in luminance between a pixel having a maximum luminance value and a pixel having a minimum luminance value in the luminance range 5 is multiplied by $g_2$. Furthermore, for example, in the case of each of the graphs in the highest coordinate plane in FIG. 4, the image processing section 140 corrects a luminance of each pixel in the luminance range 2 so that a difference in luminance between a pixel having the maximum luminance value and a pixel having the minimum luminance value in the luminance range 2 is multiplied by $g_3$. Further, the image processing section 140 corrects a luminance of each pixel in the luminance range 5 so that a difference in luminance between a pixel having the maximum luminance value and a pixel having the minimum luminance value is multiplied by $g_4$.

As is clear from the graph drawn in a full line in the highest coordinate plane in FIG. 2, the image processing section 140 of the present embodiment determines, for each i, a corrected luminance value of each pixel belonging to a class i by use of such a luminance conversion function that a relationship between an input luminance of the class i and an output luminance of the class i is expressed by a linear function whose inclination is determined in accordance with a magnitude of a corrected frequency of the class i. In other words, the image processing section 140 corrects, for each i, a luminance of each pixel belonging to a luminance range i so that a ratio of (i) a difference in luminance between any two pixels among pixels having a luminance belonging to the luminance range i to (ii) a difference between corrected luminances between the two pixels is constant.

After the process of S5 is carried out, the image processing section 140 outputs, as an output image, to the display device 200 which is externally connected to the image processing device 100, such an image that a luminance value of each pixel included in an input image has been corrected (S6).

With the operation of the image processing device 100 described above, an image which has been subjected to luminance correction is displayed on the display device 200.

(Image Displayed on Display Device 200)

An image displayed on the display device 200 has such a tendency that the larger a pixel region among the N pixel regions is, the greater a difference between a maximum luminance and a minimum luminance the pixel region has. That is, the image displayed on the display device 200 is higher in contrast as a whole than an input image which has not been subjected to luminance correction. Here, each of the N pixel regions is represented by a pixel region i (i is 1, 2, . . . , or N) constituted by pixels that had, in an input image which has not been subjected to the luminance correction, luminance values belonging to the luminance range i.

As shown by (i) the graph in a full line and the graph in a dashed-dotted line in the highest coordinate plane in FIG. 3 and (ii) the graph in a full line and the graph in a dashed-dotted line in the highest coordinate plane in FIG. 4, it is clear that the image displayed on the display device 200 has the aforementioned tendency, regardless of whether or not weighting correction is carried out with respect to frequencies. That is, pixel regions 3 and 4 on the image displayed on the display device 200, which correspond to the respective luminance ranges 3 and 4 having relatively large frequencies, are greater in difference between a maximum luminance and a minimum luminance than pixel regions 3 and 4 on an input image which has not been subjected to luminance correction. Further, pixel regions 1 and 2 on the image displayed on the display device 200, which correspond to the respective luminance ranges 1 and 2 having relatively small frequencies, are smaller in difference between a maximum luminance and a minimum luminance than pixel regions 1 and 2 on the input image which has not been subjected to the luminance correction.

Meanwhile, in a case where the weighting correction is carried out with respect to the frequencies, an image displayed on the display device 200 has the following tendency. That is, a pixel region provided on a high-luminance side is not much smaller in difference between a maximum luminance and a minimum luminance than the pixel region on the input image which has not been subjected to the luminance correction (on the contrary, there is a case where the difference between a maximum luminance and a minimum luminance might be increased), even if the pixel region corresponds to a luminance range having a relatively small frequency. This tendency is clearly shown in (i) the graph in a full line and the graph in a dashed-dotted line in FIG. 3 and (ii) the graph in a full line and the graph in a dashed-dotted line in FIG. 4. That is, the pixel regions 5 and 6 on the image displayed on the display device 200, which correspond to the respective luminance ranges 5 and 6, are not much smaller in difference between a maximum luminance and a minimum luminance than the pixel regions 5 and 6 on the image which has been subjected to luminance correction without the weighting correction of frequencies by use of weighting values.

Accordingly, it can be said that, in a case where weighting correction is carried out with respect to frequencies, an image displayed on a display device has a difference in gray scale to some extent even in local pixel region located on a high-luminance side.

Note that the following (a) and (b) were actually compared with each other: (a) an image displayed on a display device in a case where luminance correction was carried out without carrying out correction with respect to frequencies by use of weighting values; and (b) an image displayed on a display device in a case where luminance correction was carried out by correcting frequencies by use of weighting values. In the comparison, an image of a person, shown in FIG. 5, was used as an input image.

Figure 6:
FIG. 6 is a view showing an output image outputted from the image processing device illustrated in FIG. 1, which output image is obtained in such a manner that the image processing device illustrated in FIG. 1 carries out, with respect to the input image shown in FIG. 5, luminance correction processing on the basis of only the number of pixels included in each luminance range of the input image.
Figure 7:
FIG. 7 is a view showing an output image outputted from the image processing device illustrated in FIG. 1, which output image is obtained in such a manner that the image processing device illustrated in FIG. 1 carries out, with respect to the input image shown in FIG. 5, luminance correction processing on the basis of both (i) the number of pixels included in each luminance range of the input image and (ii) a weighting value which is set for each luminance range.

FIG. 6 shows the aforementioned image (a) and FIG. 7 shows the aforementioned image (b). By comparing FIGS. 6 and 7 with each other, it is clear that a highlight part (such as a forehead and a shoulder of the person, and a brim of a hat on the person) of the aforementioned image (b) (i.e., the image displayed on the display device in the case where luminance correction was carried out by correcting the frequencies by use of the weighting values) is higher in gray scale than a highlight part of the aforementioned image (a).

(Advantages of Image Processing Device 100)

As described above, according to the image processing device 100, the luminance distribution information preparation section 110 counts, for each i, the number of pixels (frequencies) having a luminance belonging to a luminance range included in an input image, so as to prepare a luminance histogram in which each luminance range serves as a class. Then, the weight correction section 120 generates, for each luminance range (each class), a weighting value which is proportional to a class value.

Further, the image processing section 140 corrects a luminance value of each pixel included in the input image so that an amount of change in difference between a maximum luminance value and a minimum luminance value in each luminance range becomes an increasing function with respect to both (i) a frequency of each luminance range and (ii) a weighting value set for each luminance range. That is, the image processing section 140 corrects, for each i, a luminance value of each pixel included in an input image so that a difference in luminance between a pixel having a maximum luminance value and a pixel having a minimum luminance value in a luminance range i increases or decreases in accordance with both (i) a magnitude of a frequency obtained by counting the number of pixels in the luminance range i, and (ii) a magnitude of a weighting value generated for the luminance range i. Note that the increasing function $\Delta(n, m)$ is, to be exact, a function that satisfies the following conditions a) and b).

a) (i) An inequality of $\Delta(n, m_1) \leq \Delta(n, m_2)$ is satisfied (where: $m_1$ and $m_2$ are arbitrarily determined so as to satisfy an inequality of $m_1 < m_2$).

(ii) At least one pair of $m_1$ and $m_2$ satisfy an inequality of $\Delta(n, m_1) < \Delta(n, m_2)$.

b) (i) An inequality of $\Delta(n_1, m) \leq \Delta(n_2, m)$ is satisfied (where: $n_1$ and $n_2$ are arbitrarily determined so as to satisfy an inequality of $n_1 < n_2$).

(ii) At least one pair of $n_1$ and $n_2$ satisfy an inequality of $\Delta(n_1, m) < \Delta(n_2, m)$.

Therefore, in a case where an input image (i) includes pixels having a high luminance locally and (ii) includes, as a whole, a large number of pixels having a luminance of not more than an intermediate luminance, the image processing device 100 (I) carries out counting so that a high luminance range has a relatively small frequency and (II) sets a relatively large weighting value for the high luminance range. Accordingly, (i) a difference between a maximum luminance and a minimum luminance in a pixel region on the high-luminance side increases, or (ii) even in a case where luminance correction causes a reduction in difference between a maximum luminance and a minimum luminance in the pixel region on the high-luminance side, such a reduction is suppressed because of a large weighting value. This makes it possible for the image processing device 100 to restrain occurrence of deterioration of gray scales in a local pixel region constituted by pixels having a high luminance after the luminance correction is carried out, which local pixel region is likely to be perceived by a viewer as having deterioration of gray scales.

Note that, even if the input image is an "image having uniform luminance distribution", i.e., all the luminance ranges of the image include approximately the same number of pixels, the image processing device 100 can obtain, by carrying out luminance correction with correcting frequencies by the use of weighting values, an output image (i) which is high in contrast as a whole, and (ii) with which a viewer is unlikely to perceive deterioration of gray scales.

Figure 8:
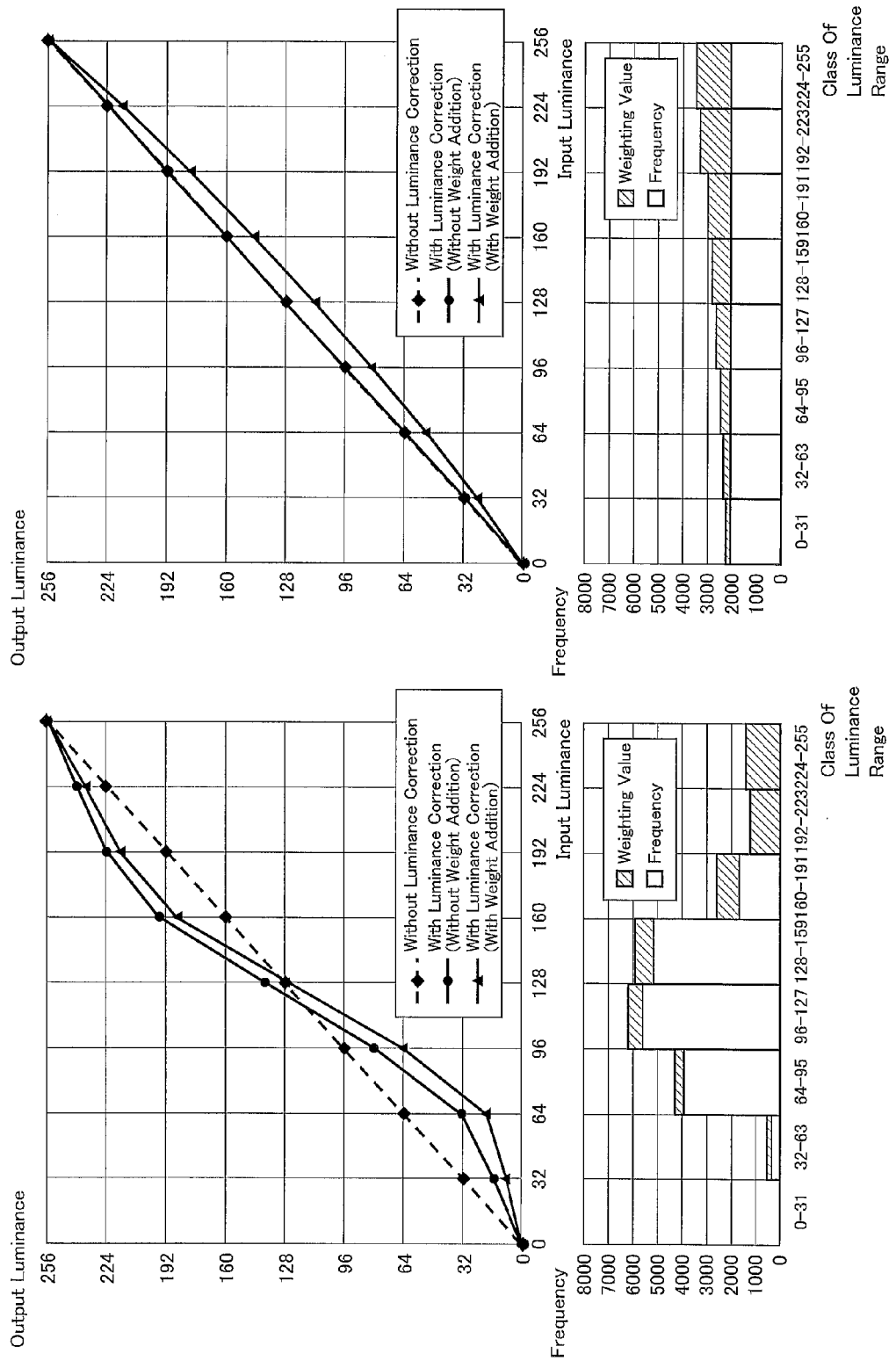
FIG. 8 is a view showing another example of a function graph indicating a relationship between a luminance value of each pixel of an input image and a luminance value of each pixel of an output image. Function graphs in a left coordinate plane are obtained in a case where a large number of pixels of the input image have an intermediate luminance value. Function graphs in a right coordinate plane are obtained in a case where the input image is such that all luminance ranges (from a low-luminance side to a high-luminance side) have approximately the same number of pixels.
Figure 9:
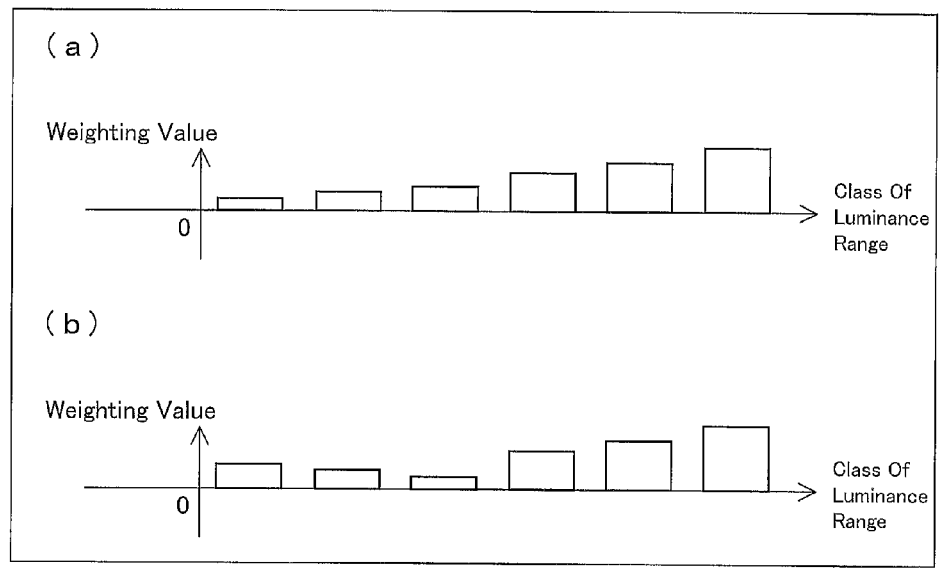
FIG. 9 (a) of FIG. 9 shows another specific example of a weighting value set for each luminance range by the image processing device illustrated in FIG. 1, and (b) of FIG. 9 shows a still another example of a weighting value set for each luminance range by the image processing device illustrated in FIG. 1.

FIG. 8 is a view showing a function graph indicating a relationship between a luminance value of each pixel of an input image and a luminance value of each pixel of an output image. A function graph in a left coordinate plane in FIG. 8 is obtained on the basis of an input image including a large number of pixels having an intermediate luminance. A function graph in a right coordinate plane in FIG. 8 is obtained on the basis of an input image having uniform luminance distribution.

As is clear from a function graph in full line, plotted with triangular marks, in the right coordinate plane in FIG. 8, the image processing device 100 can correct frequencies by use of weighting values so as to cause a pixel region on the high-luminance side on an output image to have a greater difference between a maximum luminance and a minimum luminance, even with an input image having uniform luminance distribution.

Meanwhile, by comparison between a function graph in a full line, plotted with dot marks, in the right coordinate plane in FIG. 8, and a function graph in a dotted line in the left coordinate plane in FIG. 8, it is clear that, in a case where the image processing device 100 carries out luminance correction, without using weighting values, with respect to an input image having uniform luminance distribution, the image processing device 100 cannot achieve an effect of improving image quality by such luminance correction.

Accordingly, since the image processing device 100 is capable of carrying out luminance correction on the basis of frequencies which have been subjected to weighting correction, the image processing device 100 can provide, without being influenced significantly by luminance characteristics of an input image, an output image (i) which is high in contrast as a whole, and (ii) with which a viewer is unlikely to perceive deterioration of gray scales.

Figure 12:
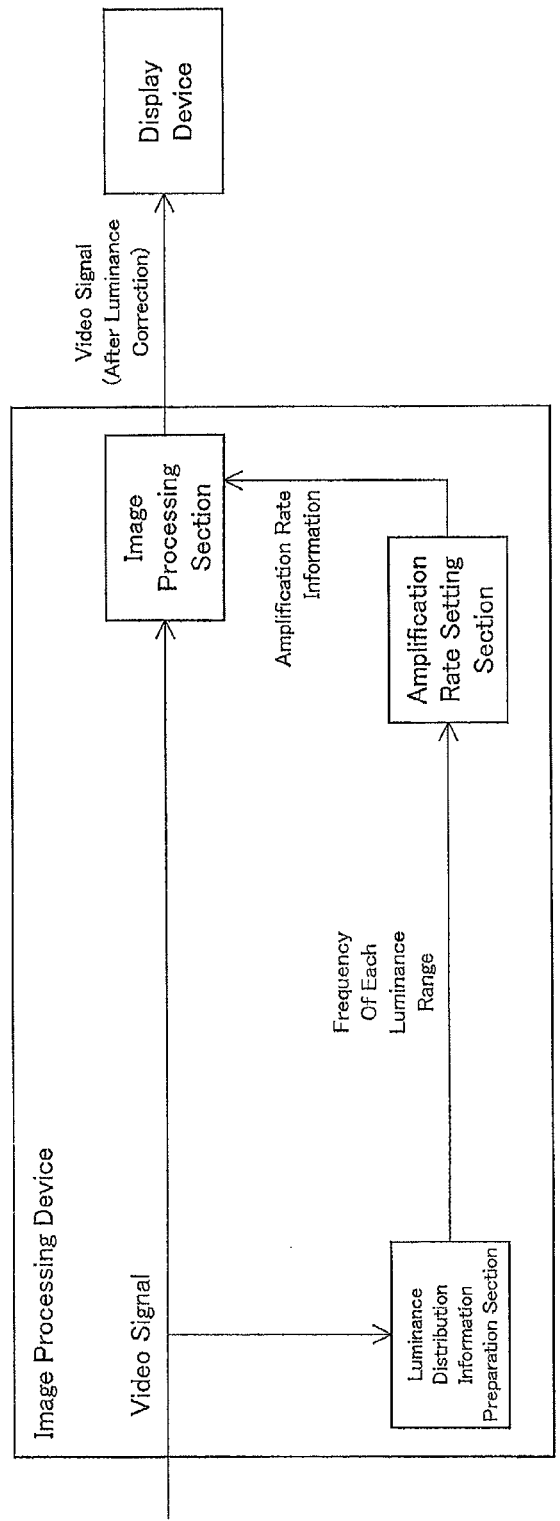
FIG. 12 is a block diagram illustrating a configuration of a conventional image processing device.
Figure 13:
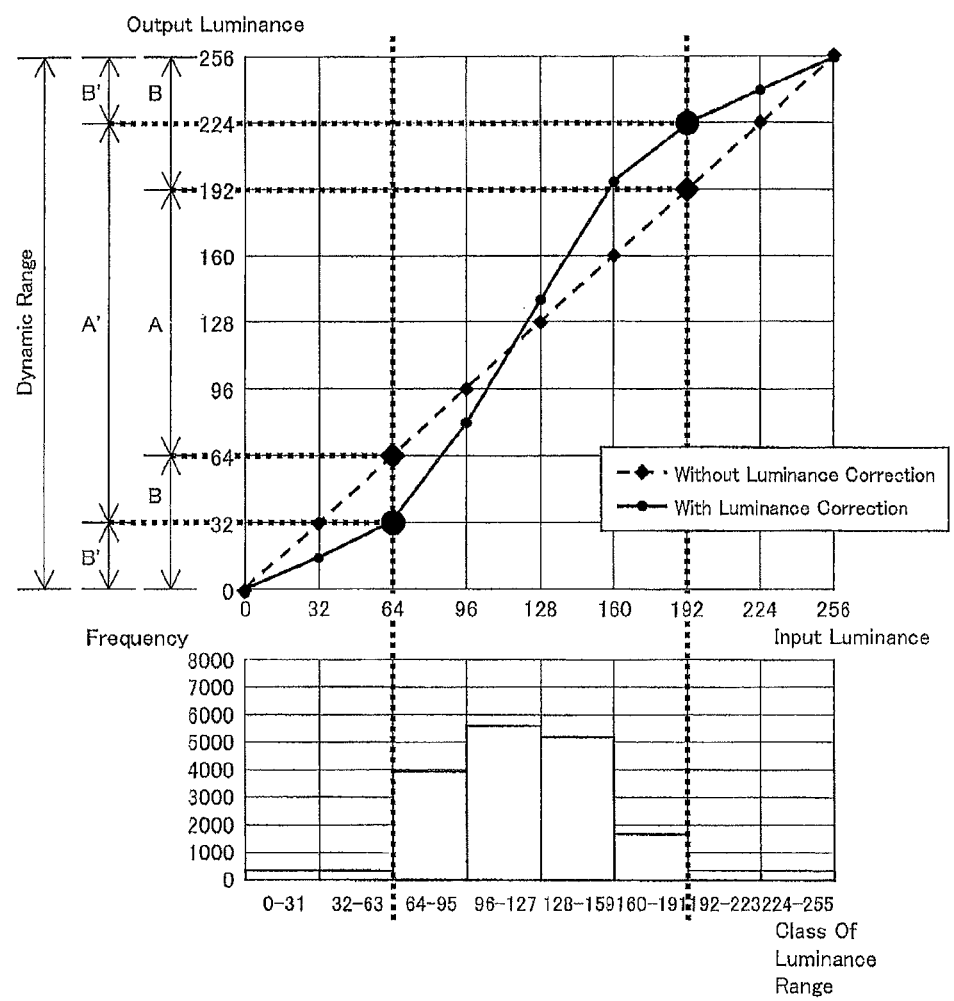
FIG. 13 is a view showing specific examples of the following (i) and (ii): (i) a luminance histogram prepared by the image processing device illustrated in FIG. 12 based on an input image which is a luminance correction target, and (ii) a function graph indicating a relationship between a luminance value of each pixel of the input image and a luminance value of each pixel of an output image that is outputted from the image processing device.
Figure 14:
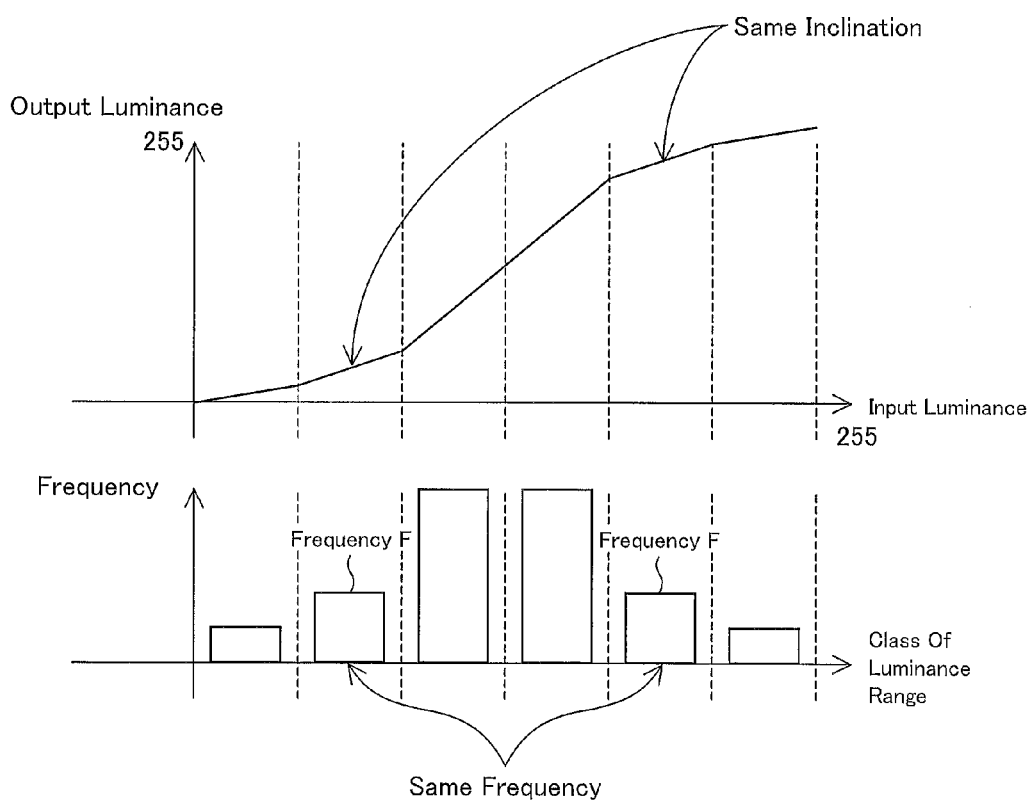
FIG. 14 is a view showing other specific examples of the following (i) and (ii): (i) a luminance histogram prepared by the image processing device illustrated in FIG. 12 based on an input image which is a luminance correction target, and (ii) a function graph indicating a relationship between a luminance value of each pixel of the input image and a luminance value of each pixel of an output image that is outputted from the image processing device.

Further, as is clear from comparison between the block diagram of FIG. 1, illustrating the image processing device 100 of the present embodiment, and a block diagram of FIG. 12, illustrating a conventional image processing device, the present invention can be realized by adding the weight correction section 120 to a conventional image processing device. As described above, it is clear that the weight correction section 120 carries out only simple calculations. For this reason, it is possible to cause the present invention to be in practice by merely adding a simple calculation circuit to a conventional image processing device.

Embodiment 2

Figure 10:
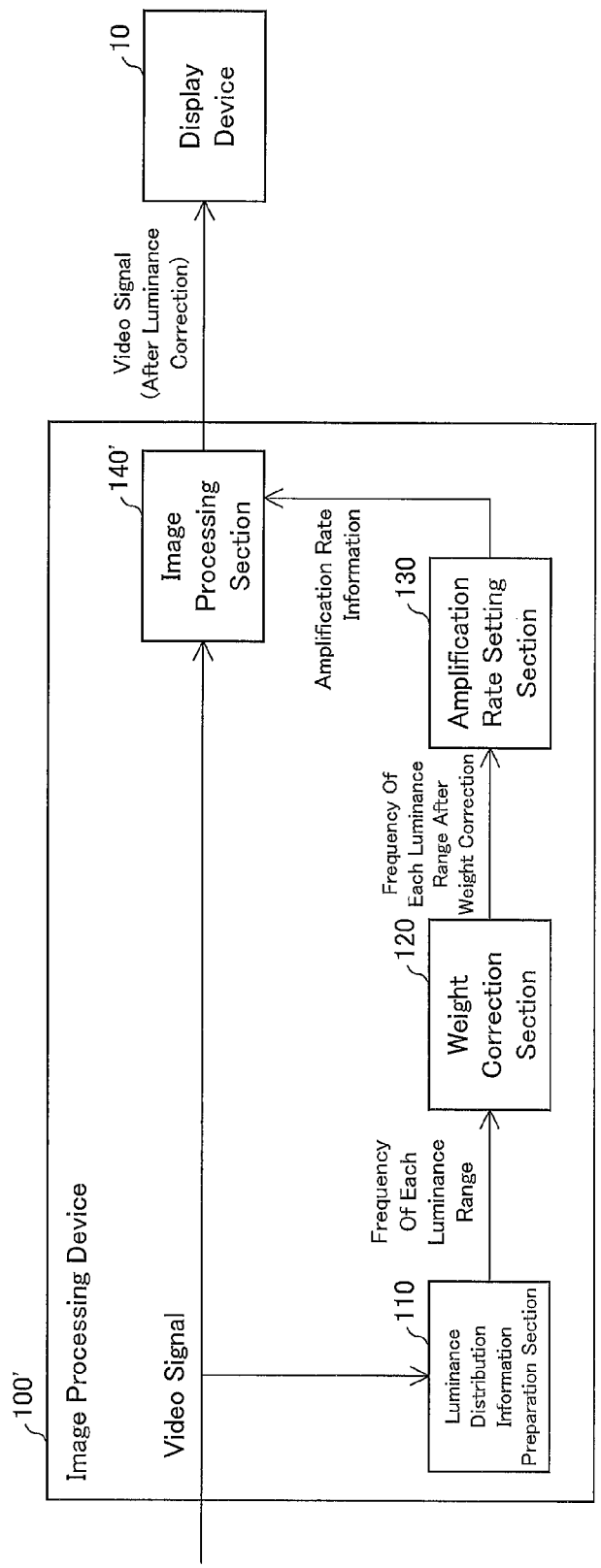
FIG. 10 is a block diagram illustrating a configuration of an image processing device in accordance with another embodiment of the present invention.
Figure 11:
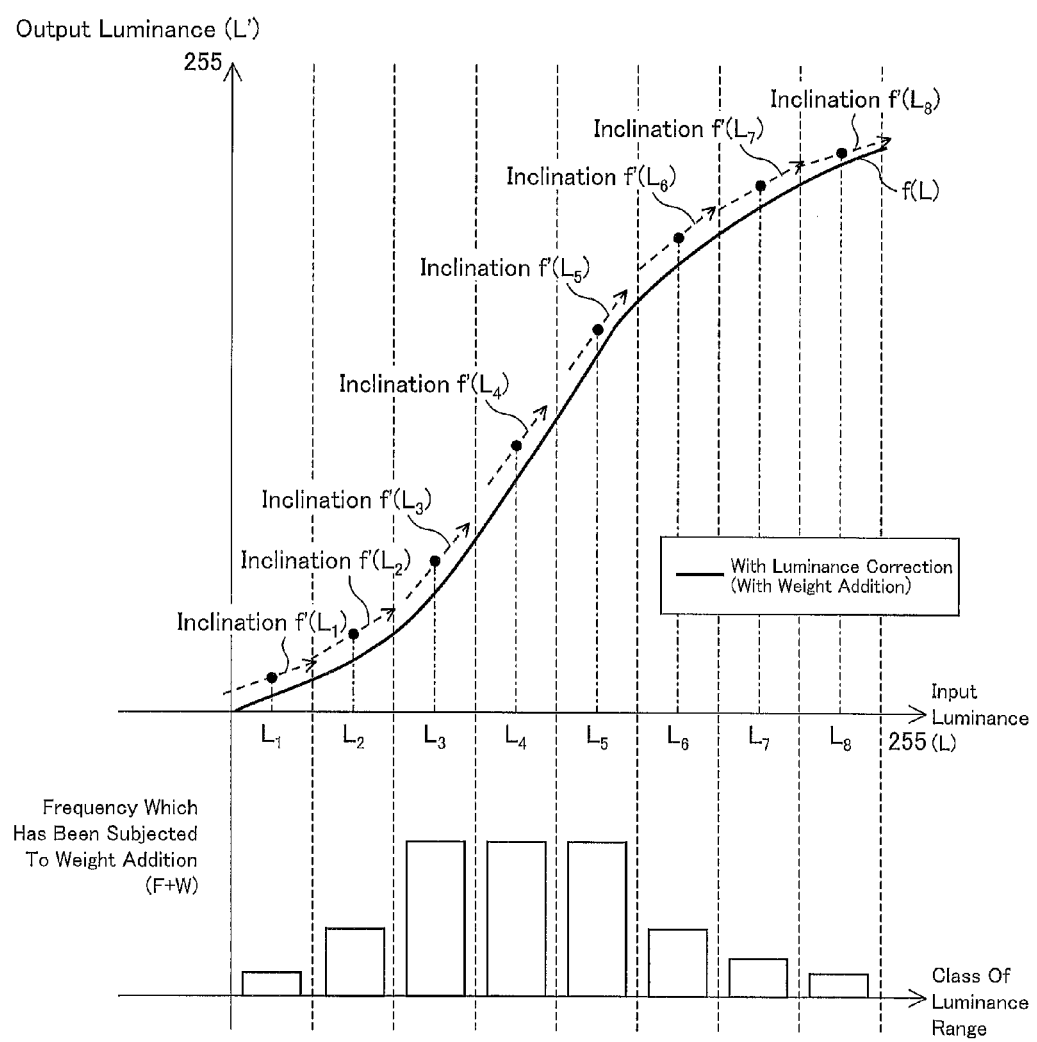
FIG. 11 is a view showing specific examples of the following (i) and (ii): (i) a weighted frequency of each class, which weighted frequency is obtained by causing a luminance histogram, prepared by the image processing device illustrated in FIG. 10 based on an input image which is a luminance correction target, to be subjected to a weight-adding process; and (ii) a function graph indicating a relationship between a luminance value of each pixel of the input image and a luminance value of each pixel of an output image that is outputted from the image processing device.

The following description will discuss, with reference to FIGS. 10 and 11, an image processing device 100' in accordance with another embodiment of the present invention.

FIG. 10 is a block diagram illustrating a configuration of the image processing device 100'.

The image processing device 100' of the present embodiment is different from an image processing device 100 of Embodiment 1 only in an image processing section (see FIG. 10). That is, an image processing section 140' provided in the image processing section 100' carries out luminance conversion on the basis of a luminance conversion function which provides a curve graph for each luminance range, unlike a luminance conversion function employed by an image processing section 140.

Next, the following description deals with how the image processing section 100' finds the luminance conversion function specifically with reference to FIG. 11. FIG. 11 is a view showing two coordinate planes. A graph in a lower coordinate plane in FIG. 11 shows an example of a luminance histogram prepared by a luminance distribution information preparation section 110. A graph in an upper coordinate plane in FIG. 11 is a function graph indicating a specific example of a luminance conversion function f (L) which is found by the image processing device 100' on the basis of the luminance histogram described above. As is clear from FIG. 11, the function graph is a curve in each luminance range. Note that operations carried out by the luminance distribution information preparation section 110, a weight correction section 120, and an amplification rate setting section 130 of the image processing device 100' are identical with operations carried out by those of the image processing device 100, and therefore their explanations are omitted here. In other words, the following description deals with an operation of the image processing section 140' from a time that amplification rate information is supplied from the amplification rate setting section 130 to a time that the luminance conversion function is found.

The image processing section 140' sets, on the basis of the amplification rate information, a first derivative value of an input luminance value (specified luminance value) which has been determined in advance for each luminance range of a target luminance conversion function. In a case where the number of luminance ranges is 8, the image processing section 140' sets, for each i, as a value of an amplification rate in a luminance range i, included in the amplification rate information, a first derivative f' ($L_i$) of f (L) at an input luminance value (i.e., a class value of each class of the luminance histogram) $L_i$ at a center of the luminance range i (for example, as shown by a graph in an upper part of FIG. 11). In other words, the first derivative value f' ($L_i$) at the input luminance value $L_i$ is set to be a value of an increasing function g (F, W) with respect to both (i) a frequency F of the luminance range i and (ii) a weighting value W set for the luminance range i.

After that, the image processing section 140' finds a luminance conversion function f (L) on the basis of the first derivative value f' ($L_i$) set for each luminance range. For example, the image processing section 140' employs curvilinear regression under a constraint condition of f' ($L_i$)=g (F, W) (where: f' ($L_i$) is a first derivative value of an input luminance value at the center of each luminance range of the target luminance conversion function f (L)). Then, the image processing section 140' sets, as the luminance conversion function f (L), such a function that a curve obtained by the curvilinear regression becomes a function graph. In this case, a constraint condition regarding an endpoint, such as f (0)=0 or f (255)= 255, can be added to the aforementioned constraint condition.

In the aforementioned operation carried out by the image processing device 100' to determine a luminance conversion function, it is desirable that the luminance conversion function is a monotone increasing function. Note, however, that, even though the luminance conversion function is not a monotone increasing function, it is possible for the image processing device 100' to correct luminances of an input image so that (i) the image becomes high in contrast as a whole, and (ii) local deterioration of gray scales is not likely to be generated.

Further, in the above description, the image processing device 100' sets, as the constraint condition, the first derivative value of the input luminance value at the center of each luminance range of the target luminance conversion function. Note, however, that the present invention is not limited to this, and the constraint condition can be a first derivative value of an input luminance value at any point in each luminance range.

(Advantage of Image Processing Device 100')

As described above, according to the image processing device 100', the luminance distribution information preparation section 110 counts, for each i, the number of pixels (frequencies) having a luminance belonging to a luminance range included in an input image, so as to prepare a luminance histogram in which each luminance range serves as a class. Then, the weight correction section 120 generates, for each luminance range (each class), a weighting value which is proportional to a class value.

Further, the image processing section 140' sets, for each i, a first derivative value of an input luminance value $L_i$ in a luminance range i of a target luminance conversion function so that the first derivative value becomes a value of an increasing function with respect to both (i) a frequency F obtained for the luminance range i and (ii) a weighting value W set for the luminance range i. Furthermore, the image processing section 140' finds the first derivative value of input luminance values of the target luminance conversion function other than the input luminance value $L_i$ of the target luminance conversion function by employing curvilinear regression under a constraint condition of a first derivative value of the luminance value $L_i$. Accordingly, each of the first derivative values of the input luminance values other than the input luminance value $L_i$ of the target luminance conversion function also generally becomes a value in accordance with an increasing function with respect to both (i) a frequency F obtained for the luminance range i and (ii) a weighting value W set for the luminance range i.

As such, a difference between two output luminance values found by applying the luminance conversion function to different two input luminance values in the luminance range i is determined by an increasing function with respect to both (i) a frequency F obtained for the luminance range i and (ii) a weighting value W set for the luminance range i. As described above, the weighting value W is larger in a high-luminance range Therefore, since, like the image processing device 100, the image processing device 100' can have an increase in contrast in the high-luminance range where deterioration of gray scales are likely to be perceived, it is possible for the image processing device 100' to provide an output image (i) which is high in contrast as a whole and (ii) with which a viewer is unlikely to perceive deterioration of gray scales.

(Additional Matter 1)

In each of the foregoing embodiments, the weight correction section 120 generates, for each luminance range (each class), a weighting value whose magnitude is in proportion to a class value. Note, however, that the present invention is not limited to this. For example, as shown in (a) of FIG. 9, the weight correction section 120 can generate a weighting value that is not in proportion to the class value.

That is, a weighting value(s) set for a part (at least 1) of N luminance ranges, which part is located on a high-luminance side with respect to the other part of N luminance range, is set to be greater than a weighting value(s) set for the other part of N luminance ranges. For example, as shown in (b) of FIG. 9, three weighting values set for luminance ranges on the high-luminance side (i.e., luminance ranges 4 to 6) are greater than weighting values set for the other luminance ranges (i.e., luminance ranges 1 to 3 which are located on a low-luminance side).

(Additional Matter 2)

In each of the foregoing embodiments, the weight correction section 120 generates N weighting values in a case where the weight correction section 120 carries out weighting correction with respect to frequencies by adding the weighting values to the frequencies. Further, the weight correction section 120 generates N weighting factors in a case where the weight correction section 120 carries out weighting correction with respect to frequencies by multiplying the frequencies by the weighting factors.

Note, however, that the present invention is not limited to this and the weight correction section 120 can carry out weighting correction with respect to frequencies as described below. That is, the weight correction section 120 can generate both (i) N weighting values (addition correction values) and (ii) N weighting factors (multiplication correction values). In this case, the weight correction section 120 can multiply, for each i, a frequency counted for a luminance range i by a weighting factor generated for the luminance range i, and then add a weighting value generated for the luminance range i to the frequency.

(Additional Matter 3)

In each of the foregoing embodiments, a video signal is externally supplied to the image processing device 100. Note, however, that the image processing device 100 is not necessarily provided with an interface for receiving a video signal. That is, the image processing device 100 can be a device having a function of generating images, such as a digital camera having an image-capturing function. In this case, the present invention can be put into practice by causing the image processing device 100 to carry out the aforementioned luminance correction with respect to an image generated by the image processing device itself.

In the foregoing embodiment, the display device 200 is provided outside the image processing device 100. However, the present invention can also be put into practice, as a matter of course, in such a manner that the image processing device 100 includes a display section.

(Program Etc.)

Lastly, each block included in the image processing device 100 can be constituted by a hardware logic. Further, control of each block included in the image processing device can be realized by software by use of a CPU (Central Processing Unit) as described below.

That is, a program code (an execute form program, an intermediate code program, or a source program) of a control program for realizing control of each of the blocks of the image processing device 100 can be computer-readably stored in a recording medium. The recording medium can be supplied to the image processing device 100, and the image processing device 100 (or CPU or MPU) can read out the program code and execute the program code thus read out.

Examples of the recording medium for supplying the program code to the image processing device 100 encompass: tapes, such as a magnetic tape and a cassette tape; disks including a magnetic disk, such as a floppy disk (registered trademark) and a hard disk, and an optical disk, such as a CD-ROM, an MO, an MD, a DVD, and a CD-R; cards, such as an IC card (including a memory card) and an optical card; and semiconductor memories, such as a mask ROM, an EPROM, an EEPROM, and a flash ROM.

Further, the object of the present invention can be also achieved with an arrangement in which the image processing device 100 is constituted to be connectable to a communication network. In this case, the program code is supplied to the image processing device 100 via the communication network. The communication network is not limited to a specific sort or a specific type, as long as the program code can be supplied to the image processing device 100 via the communication network. Examples of the communication network encompass the Internet, an intranet, an extranet, a LAN, an ISDN, a VAN, a CATV communication network, a mobile communication network, and a satellite communication network.

Furthermore, a transmission medium constituting the communication network is not limited to a specific structure or a specific sort, as long as the transmission medium can transmits the program code. Specifically, it is possible to use a wired line such as a line in compliance with an IEEE 1394 standard, a USB (Universal Serial Bus) line, a power line, a cable TV line, a telephone line, an ADSL (Asymmetric Digital Subscriber Line) line, and the like, as the transmission medium. Moreover, it is possible to use (i) a wireless line utilizing an infrared ray used in IrDA and a remote controller, (ii) a wireless line which is in compliance with a Bluetooth standard (registered trademark) or an IEEE802.11 wireless standard, and (iii) a wireless line utilizing an HDR, a mobile phone network, a satellite line, a terrestrial digital network, and the like, as the transmission medium. Note that, the present invention can be realized by a computer data signal which is realized by electronic transmission of the program code and which is embedded in a carrier wave.

As described above, an image processing device of the present invention, for correcting a luminance value of each pixel included in an image, preferably includes: counting means for counting, for each of a plurality of luminance ranges into which an entire luminance range, within which the luminance value falls, is divided, the number of pixels as a first correction value, each of the pixels being included in the image and having a luminance belonging to the each of the plurality of luminance range; setting means for setting, for each of the plurality of luminance ranges, a second correction value; and luminance correcting means for correcting the luminance value of each pixel included in the image on the basis of a luminance conversion function indicating a relationship between a luminance value of each pixel, which has not been subjected to the correcting, and a luminance value of each pixel, which has been subjected to the correcting, the luminance conversion function being such that inclination of the luminance conversion function in each of the plurality of luminance ranges is determined by an increasing function with respect to both (i) a first correction value obtained for the luminance range and (ii) a second correction value set for the luminance range, the setting means carrying out the setting so that a second correction value(s) set for a part of the plurality of luminance ranges, which is located on a high-luminance side with respect to the other part of the plurality of luminance ranges, is greater than a second correction value(s) set for the other part of the plurality of luminance ranges.

Further, an image processing method of the present invention, for use in an image processing device for correcting a luminance value of each pixel included in an image, preferably includes the steps of: counting, by counting means of the image processing device, for each of a plurality of luminance ranges into which an entire luminance range, within which the luminance value falls, is divided, the number of pixels as a first correction value, each of the pixels being included in the image and having a luminance belonging to the each of the plurality of luminance range; setting, by setting means of the image processing device, for each of the plurality of luminance ranges, a second correction value; and correcting, by luminance correcting means of the image processing device, the luminance value of each pixel included in the image on the basis of a luminance conversion function indicating a relationship between a luminance value of each pixel, which has not been subjected to the correcting, and a luminance value of each pixel, which has been subjected to the correcting, the luminance conversion function being such that inclination of the luminance conversion function in each of the plurality of luminance ranges is determined by an increasing function with respect to both (i) a first correction value obtained for the luminance range and (ii) a second correction value set for the luminance range, the setting being carried out so that a second correction value(s) set for a part of the plurality of luminance ranges, which is located on a high-luminance side with respect to the other part of the plurality of luminance ranges, is greater than a second correction value(s) set for the other part of the plurality of luminance ranges.

According to the configuration, the image processing device of the present invention and the image processing method of the present invention (i) count, for each of the plurality of luminance ranges, the number of pixels as a first correction value, each of the pixels having a luminance belonging to the each of the plurality of luminance range, and (ii) correct, for each of the plurality of luminance ranges, a luminance value of each pixel included in the image so that inclination of the luminance conversion function in the luminance range is changed by an amount equivalent to a value obtained by applying the first correction value for the luminance range to the increasing function. Therefore, in a case where a main part of an image which has not been subjected to luminance correction is constituted by a pixel region constituted by pixels having a luminance belonging to a specific luminance range, the luminance correction causes the image to have a larger difference between a maximum luminance and a minimum luminance in the main part of the image. Accordingly, it is possible to obtain, by carrying out the luminance correction, an image which is high in contrast as a whole.

Further, according to each of the configurations described above, the image processing device of the present invention and the image processing method of the present invention (i) set a second correction value for each of the plurality of luminance ranges, and (ii) correct a luminance value for each of the plurality of luminance ranges so that the greater a first correction value of the luminance range is, the greater an amplification rate of a difference between a maximum luminance and a minimum luminance is. Accordingly, in a case where a main part of an image which has not been subjected to luminance correction is constituted by a pixel region constituted by pixels having a luminance belonging to a specific luminance range, the luminance correction causes a difference between the maximum luminance and the minimum luminance in the main part to be larger. It is thus possible to obtain, by carrying out the luminance correction, an image which is high in contrast as a whole.

Further, according to each of the configurations described above, the image processing device of the present invention and the image processing method of the present invention (i) set a second correction value for each of the plurality of luminance ranges, and (ii) correct, for each of the plurality of luminance ranges, a luminance value of each pixel included in an image so that inclination of the luminance conversion function in the luminance range changes by an amount equivalent to a value obtained by applying the second correction value set for the luminance range to the increasing function. Note that, a second correction value(s) set for a part of the plurality of luminance ranges, which is located on a high-luminance side with respect to the other part of the plurality of luminance ranges, is greater than a second correction value(s) set for the other part of the plurality of luminance ranges.

That is, in a case where a target image of the luminance correction has a small number of pixels having luminances belonging to the part of the plurality of luminance range(s) on a high-luminance side, the image processing device of the present invention and the image processing method of the present invention (i) obtain, for the part of the plurality of luminance ranges, a relatively small first correction value(s) as compared with one(s) of the other part of the plurality of luminance ranges, and (ii) set, for the part of the plurality of luminance ranges, a relatively large second correction value(s) as compared with one(s) of the other part of the plurality of luminance ranges. Therefore, a difference between a maximum luminance and a minimum luminance in a pixel region constituted by pixels having luminances belonging to the part of the plurality of luminance ranges on a high-luminance side is increased by the luminance correction, or, alternatively, even if the difference is decreased by the luminance correction, the difference is decreased by a smaller amount because of a large second correction value. This makes it possible for the image processing device to suppress occurrence of deterioration of gray scales in a local pixel region constituted by pixels having high luminances after the luminance correction is carried out, which pixel region is likely to be perceived by a viewer as having the deterioration of gray scales.

Further, the image processing device of the present invention can be configured such that (I) inclination of the luminance conversion function in each of the plurality of luminance ranges, which luminance conversion function is referred to by the luminance correcting means so as to correct the luminance value of each pixel included in the image, is a value of ratio of (i) a difference between a maximum luminance value and a minimum luminance value among luminance values of pixels, belonging to the luminance range, which luminance values have been subjected to said correcting, to (ii) a difference between a maximum luminance value and a minimum luminance value among luminance values of the pixels, belonging to the luminance range, which luminance values have not been subjected to said correcting, and (II) the inclination of the luminance conversion function in each of the plurality of luminance ranges is determined by an increasing function with respect to both (i) a first correction value obtained for the luminance range and (ii) a second correction value set for the luminance range. Furthermore, the image processing device is preferably configured such that (I) inclination of the luminance conversion function in each of the plurality of luminance ranges, which luminance conversion function is referred to by the luminance correcting means so as to correct the luminance value of each pixel included in the image, is a first differential coefficient of a predetermined luminance value in the luminance range, and (II) the inclination of the luminance conversion function in each of the plurality of luminance ranges is determined by an increasing function with respect to both (i) a first correction value obtained for the luminance range and (ii) a second correction value set for the luminance range.

Further, the image processing device of the present invention is preferably configured such that the luminance correction means corrects, for each of the plurality of luminance ranges, the luminance value of each pixel included in the image so that a ratio of (i) a difference between luminances of arbitrary two pixels, belonging to the luminance range, which luminances have not been subjected to the correcting, to (ii) a difference between luminances of the arbitrary two pixels, which luminances have been subjected to the correcting, is constant.

According to the configuration, the luminance conversion function employed, for each of the plurality of luminance ranges, in luminance correction carried out by the image processing device of the present invention, is a linear function. Therefore, in a case where the luminance correction is realized with the use of a circuit, the image processing device of the present invention can be constituted by a circuit having a simple configuration. Further, in a case where the luminance correction is realized with the use of software, the image processing device of the present invention can be realized with the use of a simple calculation algorithm.

The image processing device of the present invention is preferably configured such that the luminance correcting means corrects, for each of the plurality of luminance ranges, the luminance value of each pixel included in the image so that a difference in luminance between a pixel having a maximum luminance value and a pixel having a minimum luminance value in the luminance range changes by an amount determined in accordance with a total sum of a first correction value obtained for the luminance range and a second correction value set for the luminance range.

Alternatively, the image processing device of the present invention is preferably configured such that the luminance correcting means corrects, for each of the plurality of luminance ranges, the luminance value of each pixel included in the image so that an amount of change in difference between a maximum luminance value and a minimum luminance value in the luminance range is determined by an increasing function with respect to a product obtained by multiplying a first correction value obtained for the luminance range by a second correction value set for the luminance range.

Alternatively, the image processing device of the present invention is preferably configured such that (i) the setting means sets, for each of the plurality of luminance ranges, as the second correction value, both (a) a multiplication correction value and (b) an addition correction value, and (ii) the luminance correcting means corrects, for each of the plurality of luminance ranges, the luminance value of each pixel included in the image so that an amount of change in difference between a maximum luminance value and a minimum luminance value in the luminance range is determined by an increasing function with respect to a total sum obtained by adding an addition correction value set for the luminance range to a value obtained by multiplying a first correction value set for the luminance range by a multiplication correction value set for the luminance range.

Further, in addition to each of the arrangements described above, the image processing device of the present invention is preferably configured such that a difference between second correction values of adjacent ones of the plurality of luminance ranges is constant.

Furthermore, a scope of the present invention includes (i) an image processing program for causing a computer to operate, the image processing program causing the computer to function as each means of the image processing device of the present invention, and (ii) a computer-readable recording medium in which the image processing program is recorded.

The present invention is not limited to the descriptions of the foregoing embodiments, but may be altered within the scope of the claims. That is, an embodiment derived from a combination of technical means properly altered within the scope of the claims is also encompassed in the technical scope of the present invention.

INDUSTRIAL APPLICABILITY

The present invention can be suitably used in general devices having an image processing function, such as a digital camera and a television.

REFERENCE SIGNS LIST

100: Image processing device
110: Luminance distribution information preparation section (counting means)
120: Weight correction section (setting means)
130: Amplification rate setting section
140: Image processing section (luminance correcting means)
200: Display device

The invention claimed is:

1. An image processing device for correcting a luminance value of each pixel included in an image, comprising:
counting means for counting, for each of a plurality of luminance ranges into which an entire luminance range, within which the luminance value falls, is divided, the number of pixels as a first correction value, each of the pixels being included in the image and having a luminance belonging to the each of the plurality of luminance range;
luminance correcting means for correcting the luminance value of each pixel included in the image; and
setting means for setting a second correction value for each of the plurality of luminance ranges,
in a case where (i) a first luminance range is provided on a low-luminance side with respect to a second luminance range, among the plurality of luminance ranges, and (ii) a first correction value for the first luminance range and a first correction value for the second luminance range are approximately equal to each other, the luminance correcting means correcting the luminance value of each pixel so that an amplification rate in the correcting carried out for the second luminance range is greater than an amplification rate in the correcting carried out for the first luminance range,
the luminance correcting means correcting, for each of the plurality of luminance ranges, a luminance value so that (i) the greater a first correction value of the luminance range is, the higher an amplification rate in the correcting carried out for the luminance range is, and (ii) the greater a second correction value of the luminance range is, the higher the amplification rate in the correcting carried out for the luminance range is,
the amplification rate in the correcting carried out for the first luminance range being an amplification rate of a difference between a maximum luminance and a minimum luminance, among luminances of pixels, belonging to the first luminance range included in the image,
the amplification rate in the correcting carried out for the second luminance range being an amplification rate of a difference between a maximum luminance and a minimum luminance, among luminances of pixels, belonging to the second luminance range, and
the setting means carrying out the setting so that a second correction value(s) set for a part of the plurality of luminance ranges, which is located on a high-luminance side with respect to the other part of the plurality of luminance ranges, is greater than a second correction value(s) set for the other part of the plurality of luminance ranges.

2. The image processing device as set forth in claim 1, wherein:
the amplification rate in the correcting carried out for each of the plurality of luminance ranges is a value of ratio of (i) a difference between a maximum luminance value and a minimum luminance value among luminance values of pixels, belonging to the luminance range, which luminance values have been subjected to said correcting, to (ii) a difference between a maximum luminance value and a minimum luminance value among luminance values of the pixels, belonging to the luminance range, which luminance values have not been subjected to said correcting.

3. The image processing device as set forth in claim 1, wherein:
the luminance correcting means corrects the luminance value of each pixel included in the image on the basis of a luminance conversion function indicating a relationship between a luminance value of each pixel, which has not been subjected to the correcting, and a luminance value of each pixel, which has been subjected to the correcting; and
the luminance conversion function is such that, for each of the plurality of luminance ranges, (i) the greater a first correction value for the luminance range is, the greater a differential coefficient of a predetermined luminance value in the luminance range is, and (ii) the greater a second correction value for the luminance range is, the greater the differential coefficient is.

4. The image processing device as set forth in claim 1, wherein:
the luminance correcting means corrects, for each of the plurality of luminance ranges, the luminance value of each pixel included in the image so that a ratio of (i) a difference between luminances of arbitrary two pixels, belonging to the luminance range, which luminances have not been subjected to the correcting, to (ii) a difference between luminances of the arbitrary two pixels, which luminances have been subjected to the correcting, is constant.

5. The image processing device as set forth in claim 1, wherein:
the luminance correcting means corrects, for each of the plurality of luminance ranges, a luminance value so that the greater a total sum of a first correction value and a second correction value for the luminance range is, the higher an amplification rate in the correcting carried out for the luminance range is.

6. The image processing device as set forth in claim 1, wherein:
the luminance correcting means corrects, for each of the plurality of luminance ranges, a luminance value so that the greater a product of a first correction value for the luminance range and a second correction value for the luminance range is, the higher an amplification rate in the correcting carried out for the luminance range is.

7. The image processing device as set forth in claim 5, wherein:
the setting means carries out the setting so that a difference between second correction values set for adjacent luminance ranges is constant.

8. The image processing device as set forth in claim 1, wherein:
the setting means sets, as the second correction value, both (i) a multiplication correction value and (ii) an addition correction value; and the luminance correcting means corrects, for each of the plurality of luminance ranges, a luminance value so that the greater a total sum of (i) a product of a first correction value for the luminance range and a multiplication correction value for the luminance value and (ii) an addition correction value for the luminance range is, the greater an amplification rate in the correcting carried out for the luminance range is.

9. An image processing method for use in an image processing device for correcting a luminance value of each pixel included in an image, the image processing method comprising the steps of:

counting, by counting means of the image processing device, for each of a plurality of luminance ranges into which an entire luminance range, within which the luminance value falls, is divided, the number of pixels as a first correction value, each of the pixels being included in the image and having a luminance belonging to the each of the plurality of luminance range;

correcting, by luminance correcting means of the image processing device, the luminance value of each pixel included in the image; and setting, by setting means of the image processing device, a second correction value for each of the plurality of luminance ranges, in a case where (i) a first luminance range is provided on a low-luminance side with respect to a second luminance range, among the plurality of luminance ranges, and (ii) a first correction value for the first luminance range and a first correction value for the second luminance range are approximately equal to each other, said correcting being carried out so that an amplification rate in the correcting carried out for the second luminance range is greater than an amplification rate in the correcting carried out for the first luminance range, said correcting being carried out, for each of the plurality of luminance ranges, so that (i) the greater a first correction value of the luminance range is, the higher an amplification rate in the correcting carried out for the luminance range is, and (ii) the greater a second correction value of the luminance range is, the higher the amplification rate in the correcting carried out for the luminance range is, the amplification rate in the correcting carried out for the first luminance range being an amplification rate of a difference between a maximum luminance and a minimum luminance, among luminances of pixels, belonging to the first luminance range included in the image, the amplification rate in the correcting carried out for the second luminance range being an amplification rate of a difference between a maximum luminance and a minimum luminance, among luminances of pixels, belonging to the second luminance range, and said setting being carried out so that a second correction value(s) set for a part of the plurality of luminance ranges, which is located on a high-luminance side with respect to the other part of the plurality of luminance ranges, is greater than a second correction value(s) set for the other part of the plurality of luminance ranges.

10. A non-transitory computer-readable recording medium in which an image processing program is recorded, the image processing program causing a computer to function as each means of an image processing device recited in claim 1.

11. The image processing device as set forth in claim 6, wherein:

the setting means carries out the setting so that a difference between second correction values set for adjacent luminance ranges is constant.

* * * * *